Figure 1:
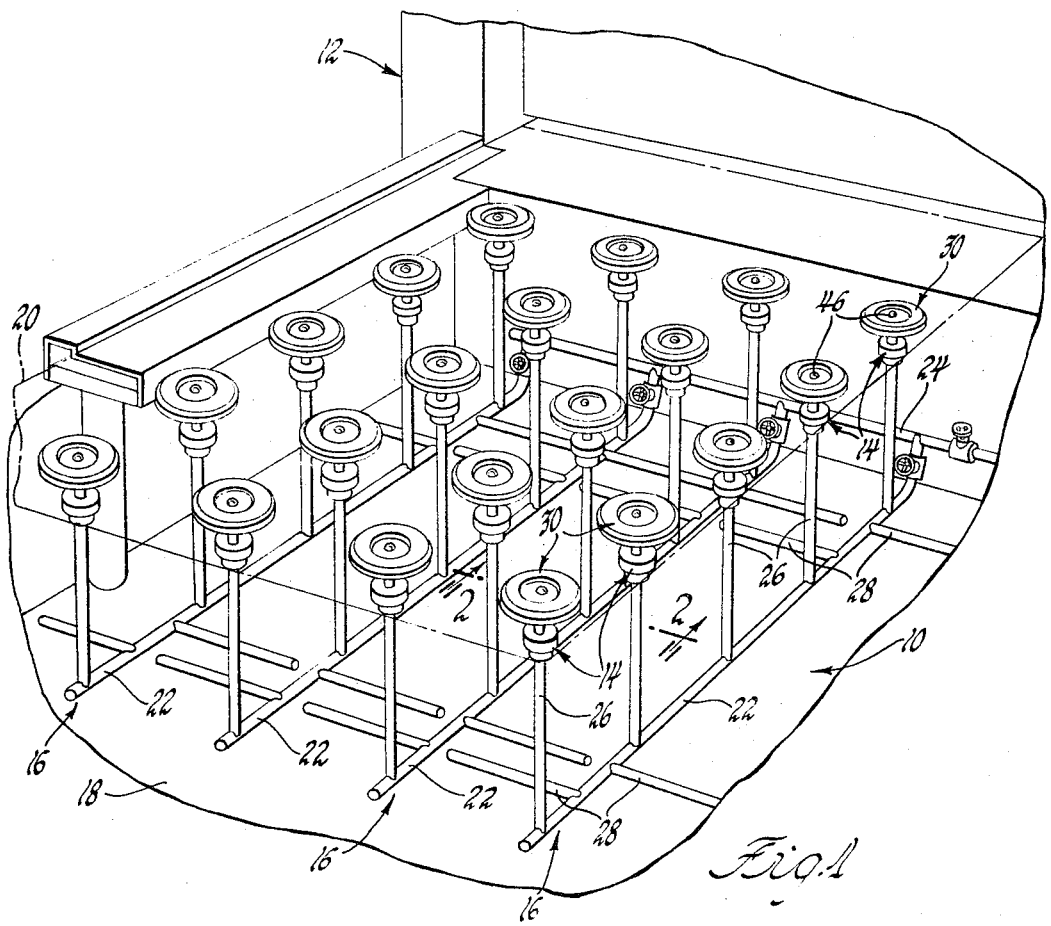

Aug. 23, 1966 — D. W. WILLOTT — 3,268,265
MATERIAL HANDLING SYSTEM
Filed Sept. 29, 1964

INVENTOR.
Douglas W. Willott
BY
W. F. Wagner
ATTORNEY

United States Patent Office 3,268,265
Patented August 23, 1966

3,268,265
MATERIAL HANDLING SYSTEM
Douglas W. Willett, La Grange, Ill., assignor to General Motors Corporation, Detroit, Mich., a corporation of Delaware
Filed Sept. 29, 1964, Ser. No. 400,170
14 Claims. (Cl. 302—29)

This invention concerns a material handling system which is adapted to support an article and facilitate movement thereof by providing a layer of air between the base of the article and the supporting surface of the system.

It is well known that heavy articles can be moved more easily from one location to another by providing a thin layer of continuously flowing air between the supporting surface and the base of the article so that the air acts as a lubricant to reduce friction and thereby minimize the amount of force needed to move the article. The typical material handling system of this type comprises a continuous flat floor portion which has a plurality of air nozzles embedded therein at spaced points with each air nozzle closed by a ball check valve arrangement that has a portion thereof protruding above the plane of the floor portion. Thus, when the base of the article is moved over the check valve arrangements, the latter are automatically opened so as to emit pressurized air beneath the article and thereby provide the air film or lubricant which reduces the frictional drag between the article and supporting surface.

The present invention contemplates an improved air support material handling system of the above described type which is characterized by having a plurality of separate, elevated, and spaced support surfaces. Each support surface incorporates an air jet assembly that includes the usual check valve assembly which serves to emit compressed air when depressed by a load. Moreover, in the preferred form, each support surface is universally movable about its support base so as to compensate for any irregularities in the base of the article being supported and thereby provides a substantially uniform thickness of support air beneath the article.

Figure 2:
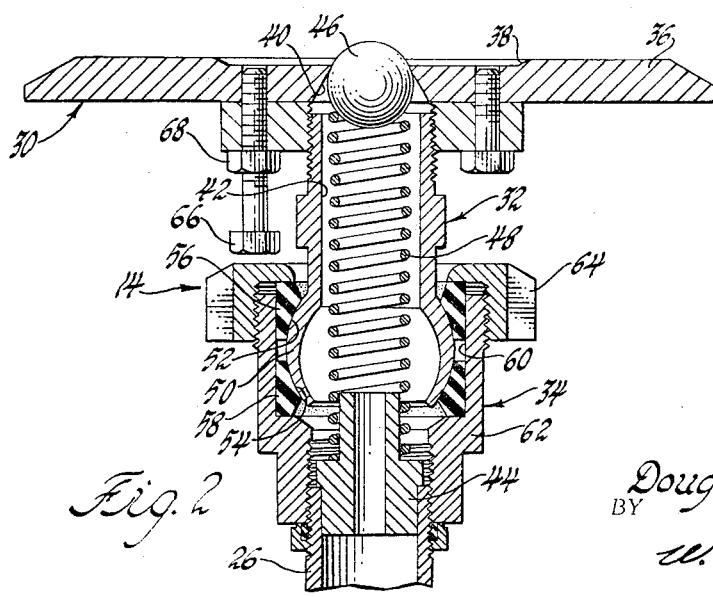

A more complete understanding of the subject invention will be derived from the following detailed description when taken in conjunction with the drawing in which:

FIGURE 1 is a perspective view showing a material handling system made in accordance with the invention and located adjacent to a machine tool, and FIGURE 2 is an enlarged sectional view of one of the air jet assemblies that is incorporated with the material handling system of FIGURE 1.

Referring now to the drawing and specifically to FIGURE 1 thereof, a material handling system 10 made in accordance with the invention is shown located next to a machine tool generally indicated by the numeral 12. The material handling system 10 comprises a plurality of identical air jet assemblies 14 that are located in spaced parallel batteries 16, each of which contains five of the air jet assemblies. In the preferred form, all of the air jet assemblies 14 are elevated above the floor 18 and located at a uniform height so as to provide an essentially planar support surface for an article such as a large sheet of steel 20 which is shown by the phantom lines.

Each battery 16 includes a common air supply pipe 22 that rests on the floor and is connected to a manifold 24 which, in turn, is connected to a source of compressed air, not shown. At spaced points along the length of the pipe 22, upstanding branch or support pipes 26 are threadably or otherwise rigidly connected to the floor pipe 22. Each branch pipe 26 terminates with one of the air jet assemblies 14 which is held upright by outriggers 28 that extend from the opposite sides of the pipe 22.

As seen in FIGURE 2, each air jet assembly 14 comprises a disk-shaped support plate 30 that is rigidly secured to an adapter member 32 which is universally pivotally supported in a socket member 34 attached to the associated branch pipe 26. More specifically, the support plate 30 has a planar support 36 that has a circular well 38 centrally formed therein. An aperture 40 that is frustum shaped in cross section is located in the center of the well 38 and communicates with a passage 42 formed in the adapter member 32. The passage 42, in turn, is in fluid communication with the branch pipe 26 via an orifice member 44 located in the upper portion of the branch pipe 26. A check valve assembly closes the aperture 40 in the support plate 30 and includes a ball member 46 which is urged into the closed position shown by a coil spring 48 which has its lower end resting on the orifice member 44. As should be apparent, the ball member 46 is of a size which permits it to close the aperture 40 and also have a portion of the ball member extending above the plane of the surface 36.

The adapter member 32 has the lower end thereof formed with an external spherical bearing surface 50 which is accommodated by a pair of internal spherical bearing surfaces 52 and 54, respectively, formed on rubber annular seals 56 and 58 located in an enlarged bore 60 formed in a connector member 62 which is secured to the branch pipe 26. The seals 56 and 58 and, accordingly the lower end of adapter member 32, are retained within the bore 60 by a collar 64 that is threadably received by the connector member 62. Thus, it should be apparent from the above description that the support plate 30 together with the adapter member 32 is adapted to move about an infinite number of horizontal axes passing through points located approximately at the center of a circle which includes the bearing surfaces 52 and 54. Also, for purposes of limiting the amount of pivotal movement of the support plate 30 relative to the branch pipe 26, one or more stops 66 can be attached to the support plate for contacting the top of the collar 64. In this case, the head of a machine bolt is used as the stop and is locked a predetermined distance from the colar 64 by a nut 68.

In operation, whenever the lower or base surface of a supported article engages the protruding portion of the ball member 46, the latter is depressed against the force of spring 48 thereby opening the aperture 40 and releasing pressurized air from the air jet assembly 14. Thus, assuming the sheet of steel 20 is placed on the several batteries 16, shown in FIGURE 1, as the sheet is fed forwardly towards the machine tool 12, the check valve arrangement of each air jet assembly 14 is opened to emit air beneath the sheet so as to facilitate conveyance of the sheet towards the machine tool. If there are any irregularities or ripples in the supported surface of the sheet 20, this is compensated for by the pivotal arrangement of each air jet assembly 14. In other words, the support plate 30 of any of the air jet assemblies is allowed to move about its ball and socket connection as aforedescribed and thereby adjust to the configuration of the sheet so that a uniform air flow is provided between the support plate 30 and the lower surface of the sheet. In addition, it will be observed that the batteries 16 are spaced from each other a distance sufficient to permit a person to walk between any pair of the assemblies 14. Thus, when a sheet is manually fed into the machine tool for fabrication, the persons doing the feeding are able to convey the sheet completely into the machine tool without any interference from the air jet assemblies.

Various changes and modifications can be made in this construction without departing from the spirit of the invention. Such changes and modifications are contemplated by the inventor and he does not wish to be limited except by the scope of the appended claims.

What is claimed is:

1. A material handling device for supporting articles and facilitating the conveyance thereof comprising, a plurality of spaced upstanding support members, each of said support members terminating with an air jet assembly having a substantially flat support surface, means universally pivotally connecting each air jet to its associated support member, said air jet assembly including a spring-biased check valve having a portion thereof extending above the plane of said support surface so that depression of said check valve by said article results in pressurized air being emitted from said jet assembly.

2. A material handling device for supporting articles and facilitating the conveyance thereof comprising, a plurality of spaced upstanding support members, each of said support members terminating with an air jet assembly having a substantially flat support disk-shaped surface, means universally pivotally connecting each air jet to its associated support member, said air jet assembly including a spring-biased check valve having a portion thereof extending above the plane of said support surface so that depression of said check valve by said article results in pressurized air being emitted from said jet assembly.

3. A material handling device for supporting articles and facilitating the conveyance thereof comprising, a plurality of spaced upstanding support members, each of said support members terminating with an air jet assembly having a substantially flat support surface, each of said support surfaces being universally pivotally movable relative to the associated support member and being spaced from the adjacent support surface, said air jet assembly including a spring-biased check valve having a portion thereof extending above the plane of said support surface so that depression of said check valve by said article results in pressurized air being emitted from said jet assembly.

4. A material handling device for supporting articles and facilitating the conveyance thereof comprising, a plurality of spaced upstanding support members, each of said support members terminating with an air jet assembly having a substantially flat support surface, a source of compressed air, each of said support members having a passage formed therein for connecting said source with the associated air jet assembly, means universally pivotally connecting each air jet to its associated support member, said air jet assembly including a spring-biased check valve having a portion thereof extending above the plane of said support surface so that depression of said check valve by said article results in pressurized air being emitted from said jet assembly.

5. A material handling device for supporting articles and facilitating the conveyance thereof comprising, a plurality of uniformly spaced upstanding pipes, a source of compressed air, said pipes being connected to said source of compressed air, the upper portion of each of said pipes terminating with an air jet assembly, said air jet assembly comprising a plate having a flat support surface, means universally pivotally supporting said plate on the upper portion of said pipe, an aperture centrally formed in said plate and communicating with the interior of said pipe, a valve member normally closing said aperture and having a portion extending above the plane of said support surface, a spring biasing said valve member towards the closed position.

6. A material handling device for supporting articles and facilitating the conveyance thereof comprising, a plurality of uniformly spaced upstanding pipes, a source of compressed air, said pipes being connected to said source of compressed air, the upper portion of each of said pipes terminating with an air jet assembly, said air jet assembly comprising a plate having a flat support surface, means universally pivotally supporting said plate on the upper portion of said pipe, an aperture centrally formed in said plate and communicating with the interior of said pipe, a ball normally closing said aperture and having a portion extending above the plane of said support surface, a spring biasing said ball towards the closed position and permitting the weight of said article to depress said ball to emit pressurized air from said air jet assembly.

7. A material handling device for supporting articles and facilitating the conveyance thereof comprising, a plurality of uniformly spaced upstanding pipes of equal length, a source of compressed air, the lower portions of said pipes being connected to said source of compressed air, the upper portion of each of said pipes terminating with an air jet assembly, said air jet assembly comprising a disk-shaped plate having a flat support surface, means universally pivotally supporting said plate on the upper portion of said pipe, an aperture centrally formed in said plate and communicating with the interior of said pipe, a ball normally closing said aperture and having a portion extending above the plane of said support surface, a spring biasing said ball towards the closed position and permitting the weight of said article to depress said ball to emit pressurized air from said air jet assembly.

8. An air jet assembly for supporting articles and facilitating the conveyance thereof comprising a support member, an adapter member, means universally pivotally supporting said adapter member on the support member, a plate fixed to said adapter member and having a flat support surface, an aperture formed in said support plate, a source of compressed air connected to said aperture, a valve member seated in the aperture and having a portion located above the plane of said support surface, a spring urging said valve member into the aperture so as to normally close the latter and permitting depression of said portion by the weight of said article so as to open the aperture to emit pressurized air.

9. An air jet assembly for supporting articles and facilitating the conveyance thereof comprising a support member, an adapter member, means universally pivotally supporting said adapter member on the support member, a disk-shaped plate fixed to said adapter member and having a flat support surface, an aperture centrally formed in said plate, a passage formed in said adapter member and communicating with said aperture, a source of compressed air connected to said passage, a valve member having a diameter greater than the diameter of said aperture seated in the latter and having a portion located above the plane of said support surface, a spring urging said valve member into the aperture so as to normally close the latter and permitting depression of said portion by the weight of said article so as to open the aperture to emit pressurized air.

10. An air jet assembly for supporting articles and facilitating the conveyance thereof comprising a support member, a socket member connected to said support member and having an internal spherical bearing surface, an adapter member having one end thereof formed with an external spherical bearing surface, said one end of said adapter member being located in said socket member with said spherical surfaces of the respective members cooperating so as to provide universal pivotal movement of the adapter member relative to the support member, a plate fixed to the other end of said adapter member and having a flat support surface, a circular aperture centrally formed in said plate, a passage formed in said adapter member and communicating with said aperture, a source of compressed air connected to said passage, a ball seated in the aperture and having a portion located above the plane of said support surface, a spring urging said ball into the aperture so as to normally close the latter and permitting depression of said ball portion by the weight of said article so as to open the aperture to emit pressurized air.

11. An air jet assembly for supporting articles and facilitating the conveyance thereof comprising a support member, a socket member connected to said support member and having an internal spherical bearing surface, an adapter member having one end thereof formed with an external spherical bearing surface, said one end of said adapter member being located in said socket member with said spherical surfaces of the respective members cooperating so as to provide universal pivotal movement of the adapter member relative to the support member, a disk-shaped plate fixed to the other end of said adapter member and having a flat support surface, a circular aperture centrally formed in said plate, a passage formed in said adapter member and communicating with said aperture, a source of compressed air connected to said passage, a ball having a diameter greater than the diameter of said aperture seated in the latter and having a portion located above the plane of said support surface, a spring urging said ball into the aperture so as to normally close the latter and permitting depression of said ball portion by the weight of said article so as to open the aperture to emit pressurized air.

12. An air jet assembly for supporting articles and facilitating the conveyance thereof comprising a support member, a socket member connected to said support member and having an internal spherical bearing surface, an adapter member having one end thereof formed with an external spherical bearing surface, said one end of said adapter member being located in said socket member with said spherical surfaces of the respective members cooperating so as to provide universal pivotal movement of the adapter member relative to the support member, a disk-shaped plate fixed to the other end of said adapter member and having a flat support surface, a circular aperture centrally formed in said plate, a passage formed in said adapter member and communicating with said aperture, a source of compressed air connected to said passage, a ball having a diameter greater than the diameter of said aperture seated in the latter and having a portion located above the plane of said support surface, a spring urging said ball into the aperture so as to normally close the latter and permitting depression of said ball portion by the weight of said article so as to open the aperture to emit pressurized air, and means connected to said plate and adapter to contact said support member to limit pivotal movement of said adapter member.

13. The device of claim 12 wherein adjustable means are provided for limiting pivotal movement of said plate.

14. A material handling device for supporting articles and facilitating the conveyance thereof comprising, a plurality of air jet assemblies, each of said air jet assemblies having a substantially flat support surface, said support surfaces being spaced form each other and independently supported for universal pivotal movement so as to compensate for irregularities in the base surface of the supported article.

References Cited by the Examiner

UNITED STATES PATENTS

| | | |
|---|---|---|
| 1,322,808 | 11/1919 | Mikaelson. |
| 2,257,937 | 10/1941 | Brunnhoelzl _____ 193—36 |
| 2,785,928 | 3/1957 | Hanson _____ 302—29 |

EVON C. BLUNK, *Primary Examiner.*

ANDRES H. NIELSEN, *Examiner.*